US012789567B1

(12) United States Patent
Holt et al.

(10) Patent No.: US 12,789,567 B1

(45) Date of Patent: Nov. 10, 2026

(54) INTERLOCK SPRING SEAT

(71) Applicant: ArvinMeritor Technology, LLC, Troy, MI (US)

(72) Inventors: Craig A. Holt, Chesterfield Township, MI (US); Luis G. Schuck, Troy, MI (US); Ankita R. Srinivas, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 15 days.

(21) Appl. No.: 19/225,799

(22) Filed: Jun. 2, 2025

(51) Int. Cl.

| | |
|---|---|
| ***B60G 9/02*** | (2006.01) |
| ***B60G 11/04*** | (2006.01) |
| ***B60G 11/113*** | (2006.01) |

(52) U.S. Cl.

CPC .............. *B60G 11/113* (2013.01); *B60G 9/02* (2013.01); *B60G 11/04* (2013.01); *B60G 2200/326* (2013.01); *B60G 2202/112* (2013.01); *B60G 2204/121* (2013.01)

(58) Field of Classification Search

CPC . B60G 9/00; B60G 9/003; B60G 9/02; B60G 11/02; B60G 11/04; B60G 11/10; B60G 11/113; B60G 2200/30; B60G 2200/31; B60G 2200/32; B60G 2200/326; B60G 2202/11; B60G 2202/112; B60G 2204/121; B60G 2204/4306; B60G 2206/30; B60G 2206/32; B60G 2206/428; B60G 2206/8201; F16F 1/18; F16F 1/26; F16F 1/3683; F16F 1/3842; F16F 1/3849

USPC ...................................................... 280/124.11

See application file for complete search history.

(56) References Cited

U.S. PATENT DOCUMENTS

| | | | | |
|---|---|---|---|---|
| 2,929,617 A * | 3/1960 | Gray | B60G 11/28 | 280/124.1 |
| 4,077,654 A * | 3/1978 | Brandt | B60G 11/113 | 267/260 |
| 4,281,851 A * | 8/1981 | Brandt | B60G 11/113 | 280/124.121 |
| 5,375,871 A | 12/1994 | Mitchell et al. | | |
| 7,267,348 B1 | 9/2007 | Klein et al. | | |
| 10,017,021 B2 | 7/2018 | Saieg et al. | | |
| 11,118,645 B2 | 9/2021 | Gregg et al. | | |
| 2015/0014953 A1* | 1/2015 | Pierce | B60B 35/007 | 280/124.1 |
| 2016/0152106 A1* | 6/2016 | Preijert | F16F 3/023 | 267/40 |
| 2017/0190230 A1* | 7/2017 | Saieg | B60G 9/003 | |
| 2018/0126815 A1* | 5/2018 | Berlingieri | B60G 11/10 | |
| 2019/0315176 A1* | 10/2019 | Peck | B60G 11/113 | |

(Continued)

FOREIGN PATENT DOCUMENTS

| | | | |
|---|---|---|---|
| CN | 105358332 A * | 2/2016 | B60B 35/005 |
| CN | 112638669 B * | 2/2025 | B60G 11/12 |
| EP | 1640191 B1 * | 8/2008 | B60G 9/003 |

(Continued)

*Primary Examiner* — Daniel M. Keck

(74) *Attorney, Agent, or Firm* — Jordan IP Law, LLC

(57) ABSTRACT

A spring suspension support assembly comprises an axle and a saddle disposed on the axle, and forming a recess. The spring suspension support assembly includes a spring seat disposed on the saddle and forming a protrusion to extend into the recess and interlock with the recess of the saddle to reduce relative movement between the saddle and the spring seat.

19 Claims, 15 Drawing Sheets

(56) References Cited

U.S. PATENT DOCUMENTS

| | | | | |
|---|---|---|---|---|
| 2020/0072310 A1* | 3/2020 | Gregg | .................... | B60G 11/04 |

FOREIGN PATENT DOCUMENTS

| | | | | |
|---|---|---|---|---|
| EP | 3461653 A1 * | 4/2019 | ........... | B60B 35/006 |
| WO | WO-2009035520 A1 * | 3/2009 | ............. | B60G 9/003 |
| WO | WO-2012078031 A1 * | 6/2012 | ............. | B60G 7/008 |
| WO | WO-2023189864 A1 * | 10/2023 | ............... | B60G 9/04 |

* cited by examiner

INTERLOCK SPRING SEAT

FIELD

The present disclosure relates generally to an interlock spring seat system and to such a system that is capable of accommodating spring seats of different heights onto a saddle.

BACKGROUND

As known in the art, a spring seat is a type of seating mechanism commonly used in suspension systems or other mechanical assemblies. A prior art example is shown in FIGS. 1A-1B. FIG. 1A illustrates a side view of a suspension 100, and FIG. 1B illustrates an exploded view of the suspension 100. In such mechanisms, a spring 102 (e.g., leaf spring) needs to be securely positioned to cushion impacts. That is, the spring 102 supports the weight of a vehicle, absorbs shock, and controls the ride height. The design may ensure that the spring 102 is held firmly in place to reduce and/or prevent movement or misalignment during operation. The spring seat 104 provides additional stability by keeping the spring 102 aligned, reducing unwanted movement or noise.

As shown, the spring seat 104 is welded to an axle 106 to reduce movement and/or misalignment. In such cases, the spring seat 104 is permanently attached to the axle 106 via a welding process. The spring seat 104 provides a stable base for the spring 102 and other elements to absorb shocks and maintain vehicle alignment. U-bolts 108 may fasten the spring 102 with the spring seat 104. The spring 102 may be connected to a vehicle's chassis and/or frame at one or both ends, and to the spring seat 104 in the center of the leaf spring 102.

Spring seats, however, have different heights for different applications and specifications. For example, in FIG. 2 designs 200 several different spring seats 202-206 are illustrated. A first spring seat 202 has the smallest height, a second spring seat 204 has an intermediate height and a third spring seat 206 has the greatest height. The first spring seat 202, second spring seat 204 and third spring seat 206 are adapted for different applications and specifications.

If there is a misunderstanding about the optimal height for the spring seat 104, the spring seat 104 may be incorrectly sized for applications. In such cases, the spring seat 104 and the axle 106 combination is rendered effectively useless since the spring seat 104 fails to meet a specification standard.

In other cases, axles and seat springs of various heights can be pre-assembled prior to final seat heights being known. Doing so, however, creates complications in inventory management. For example, certain seat heights may be oversupplied while other seat heights may be undersupplied. Moreover, coordination of various seat heights and proper shipment adds a layer of complication that is prone to error and prolonged shipment times.

WO 2020/047230 includes a mounting band that extends around a central tube. The mounting band may include a pair of lateral projections or tabs extending from each edge of the mounting band. A top spring seat is indirectly attached to the axle. In particular, the top spring seat is disposed over and fixed only to the mounting band once the mounting band has been attached to the central tube. Line welds are formed along the interfaces between the outer surface of the mounting band and the end walls of the top spring seat to secure the top spring seat to the mounting band. Notably however the mounting band has a cumbersome, large design, and connecting the top spring seat to the mounting band requires welding which is time consuming, permanent and error prone.

Thus, techniques that overcome shortcomings of existing suspension systems would be a welcome addition to the art.

SUMMARY

The present disclosure generally relates to a saddle and spring seat mounted to the saddle to reduce and/or prevent relative movement between the spring seat and saddle. In particular, the use of an aperture(s) or recess(es) formed on the saddle and protrusion(s) formed on the spring seat removably interlocks the saddle and spring seat to provide a flexible design process. For example, production (e.g., attachment of the mount to an axle and painting of the axle and mount) may begin prior to a final seat height being known and reduces the inventory management complications noted above.

In one example implementation, a spring suspension support assembly includes an axle, a saddle disposed on the axle and forming a recess, and a spring seat disposed on the saddle and forming a protrusion to extend into the recess and interlock with the recess of the saddle to reduce relative movement between the saddle and the spring seat.

In one example implementation, the techniques described herein relate to a spring suspension support assembly, where the recess is a groove formed over only a top quadrant of the axle.

In one example implementation, the techniques described herein relate to a spring suspension support assembly, wherein the saddle is formed over less than 180° of the axle.

In one example implementation, the techniques described herein relate to a spring suspension support assembly, wherein the spring seat is in direct contact with the axle.

In one example implementation, the techniques described herein relate to a spring suspension support assembly, where the protrusion extends into an area defined by the recess.

In one example implementation, the techniques described herein relate to a spring suspension support assembly, where the protrusion is defined by first and second curved recesses.

In one example implementation, the techniques described herein relate to a spring suspension support assembly, wherein the interlocking between the protrusion and the recess prevents the spring seat from moving circumferentially and axially on the axle.

In one example implementation, the techniques described herein relate to a spring suspension support assembly, where the protrusion and the recess interlock together to form a releasable connection between the saddle and the spring seat.

In one example implementation, the techniques described herein relate to a spring suspension support assembly, where the saddle has a welded connection to the axle.

In one example implementation, the techniques described herein relate to a spring suspension support assembly, wherein the spring seat has a non-uniform radius as measured from an axis of the spring seat.

In one example implementation, the techniques described herein relate to a spring suspension support assembly, where the radius of the spring seat at the protrusion is less than the radius of the spring seat at an area outside the protrusion.

In one example implementation, the techniques described herein relate to a suspension system including the spring suspension support assembly, and a leaf spring disposed on the spring suspension support assembly.

In one example implementation, the techniques described herein relate to the recess being disposed in a side quadrant of the axle.

In one example implementation, the techniques described herein relate to a saddle disposed on an axle, the saddle including a central portion forming a recess, the central portion having a first axial length as measured along an axis of the axle, and a peripheral portion having a second axial length as measured along the axis of the axle, where the second axial length is greater than the first axial length.

In one example implementation, the techniques described herein relate to a saddle, where the recess is a groove formed over only a top quadrant of the axle.

In one example implementation, the techniques described herein relate to a saddle, where the saddle is formed over less than 180° of the axle.

In one example implementation, the techniques described herein relate to a saddle, where the saddle has a welded connection to the axle.

In one example implementation, the techniques described herein relate to a spring seat disposed on an axle and saddle, the spring seat including a protrusion to extend into a recess of the saddle and interlock with the recess of the saddle to reduce relative movement between the saddle and the spring seat, and a portion that extends over the saddle.

In one example implementation, the techniques described herein relate to a spring seat, where the spring seat is in direct contact with the axle.

In one example implementation, the techniques described herein relate to a spring seat, where the protrusion is a protrusion that extends into an area defined by the recess, the protrusion is defined by first and second curved recesses, the protrusion and the recess interlock together to form a releasable connection between the saddle and the spring seat and reduce the spring seat from moving circumferentially and axially on the axle, the spring seat has a non-uniform radius as measured from an axis of the spring seat, and the radius of the spring seat at the protrusion is less than the radius of the spring seat at an area outside the protrusion.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF DRAWINGS

The foregoing and other features and advantages will be discussed in detail in the following non-limiting description of specific embodiments in connection with the accompanying drawings, in which.

Like reference symbols in the various drawings may indicate like elements.

DESCRIPTION

Figure 1A:
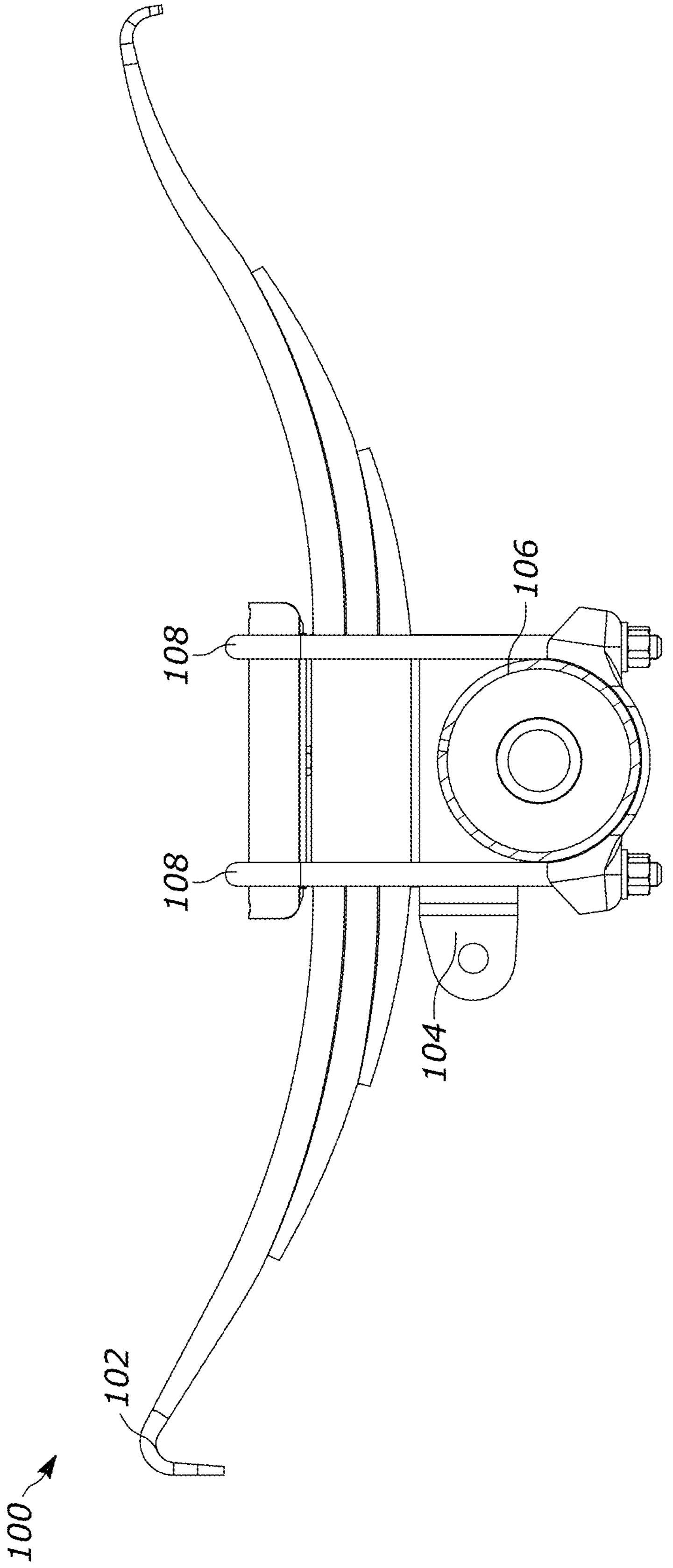
Prior Art FIG. 1A
FIGS. 1A-1B are respective elevational and exploded, perspective views of a prior art suspension system.
Figure 1B:
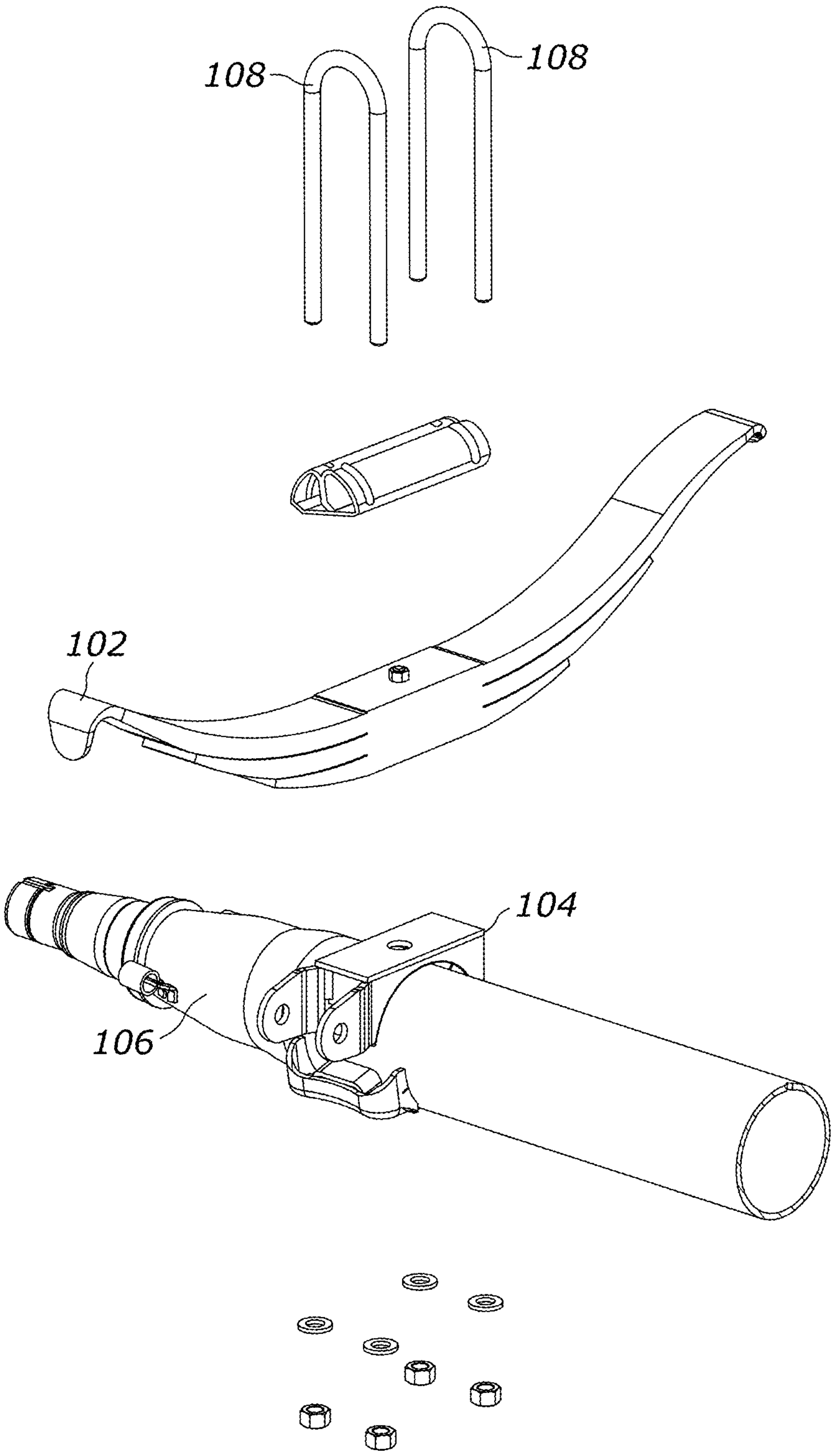
Prior Art FIG. 1B
Figure 2:
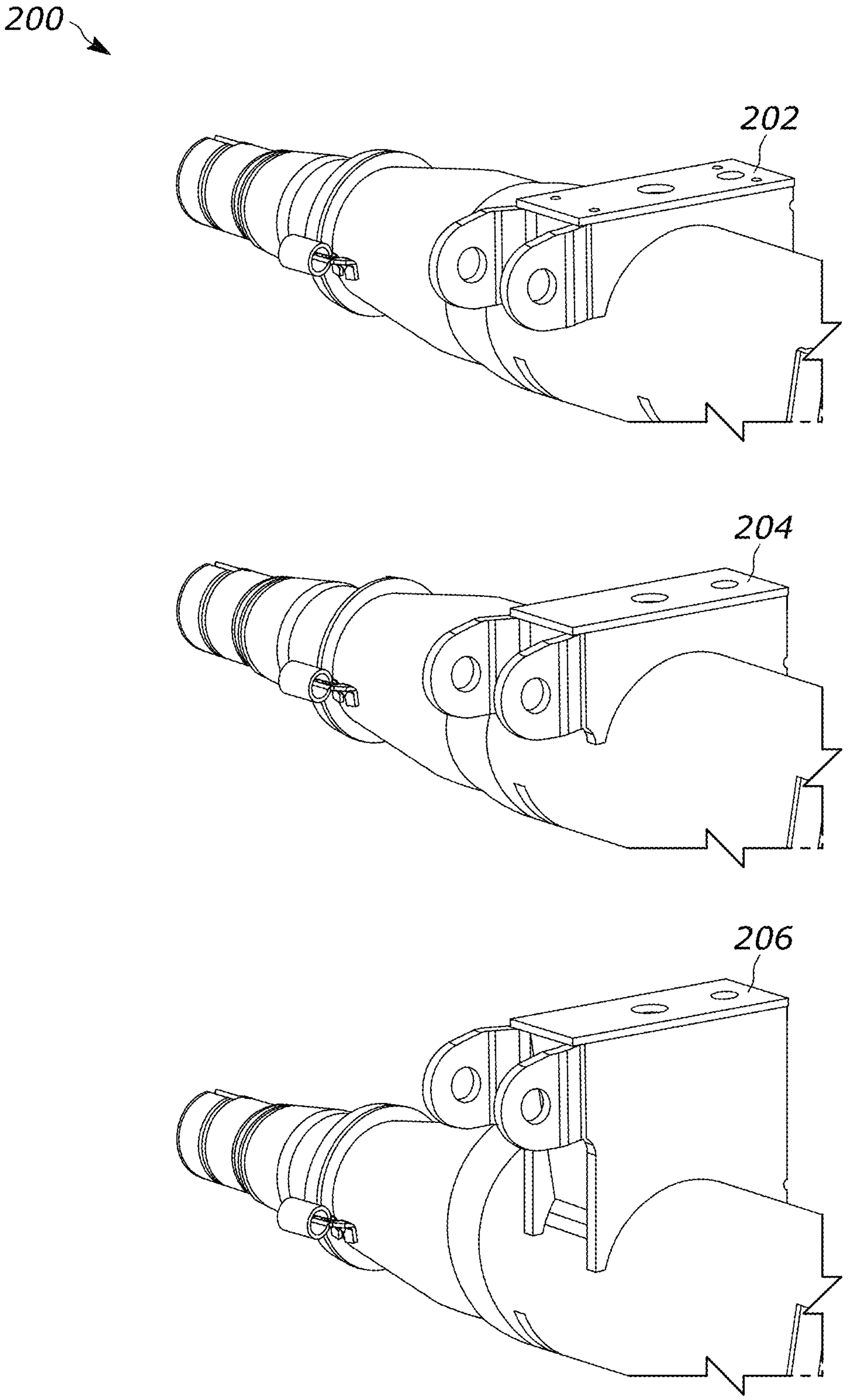
Prior Art FIG. 2
FIG. 2 is a perspective view of prior art spring seats.
Figure 3A:
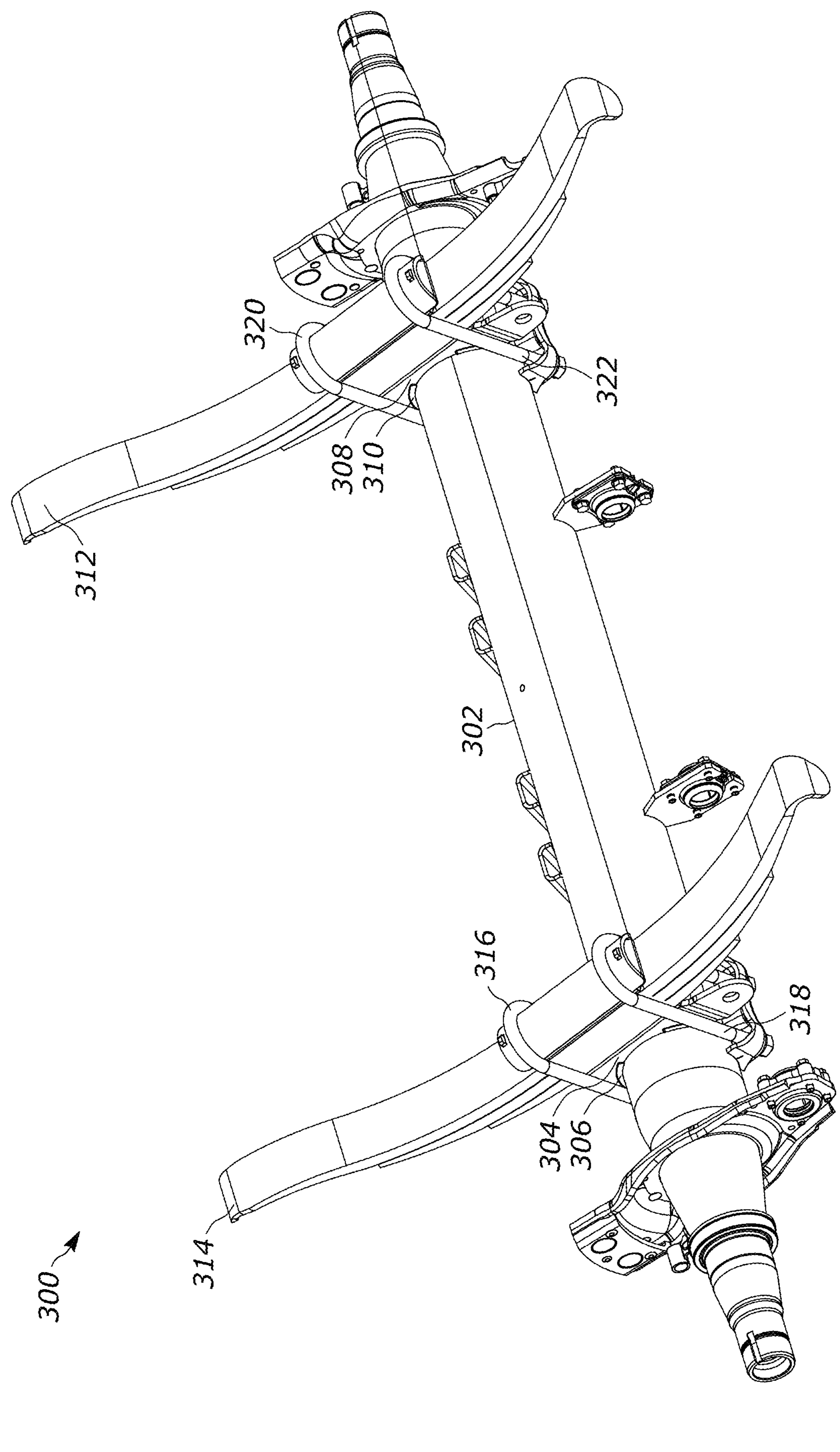
FIGS. 3A, 3B, 3C, 3D, 3E, 3F, 3G and 3H are respective elevational and exploded, perspective views illustrating details of a suspension system including components of spring seats and saddles according to one or more example implementations of the instant disclosure.

Turning now to FIG. 3A, a suspension sub-assembly 300 that addresses the above problems is described. The suspension sub-assembly 300 includes a single axle weldment approach. In detail, saddles 306, 310 are provided on the axle 302. The saddles 306, 310 are fastened to axle 302. In some examples, the saddles 306, 310 are attached to the axle 302 in a permanent fashion (e.g., welding).

As will be explained below, the saddles 306, 310 can include recesses **306*d* (illustrated in FIGS. 3D, 3E and 3F for saddle 306 but not illustrated in detail for saddle 310 for brevity) to accommodate spring seats 304, 308. The spring seats 304, 308 may include protrusions (such as central portions 304*c* illustrated below) that extend into the recesses 306*d* to fasten the spring seats 304, 308 to the saddles 306, 310. For example, the protrusions of the spring seats 304, 308 interlock with the recesses 306*d* of the saddles 306, 310 to reduce relative movement between the saddles 306, 310 and the spring seats 304, 308. The spring seats 304, 308 may be removably attached to the saddles 306, 310**.

The saddles 306, 310 are compatible with a wide range of spring seat heights. Accordingly, the axle 302 may be fitted with the saddles 306, 310 and remain flexible in use and compatibility during production. That is, spring seats 304, 308 may be any height and are still able to be mounted onto the saddles 306, 310 to remain firmly locked into place by interlocking the protrusions with the recesses **306*d*. Furthermore, welded connections between the spring seats 304, 308 and the saddles 306, 310** may be avoided reducing processing time and complications from welding.

The spring seats 304, 308 support leaf springs 312, 314 which provide suspension and support. The leaf springs 312, 314 are a simple and durable system that uses stacked, curved metal strips (or "leaves") to provide support and absorption of shocks and vibrations from the road. U-bolts 316, 318, 320, 322 firmly secure the spring seats 304, 308, leaf springs 312, 314 and the axle 302 together.

Notably, the flexibility of the suspension sub-assembly 300 to accommodate different heights of the spring seats 304, 308 reduces inventory and supply constraints. For example, the saddles 306, 310 may be welded to the axle 302 prior to a final leaf spring height of the spring seats 304, 308 being selected. Accordingly, the saddles 306, 310 and the axle 302 may be pre-manufactured (e.g., saddles 306, 310 welded to the axle 302 and painted) reducing wait times and downstream delays.

Figure 3B:
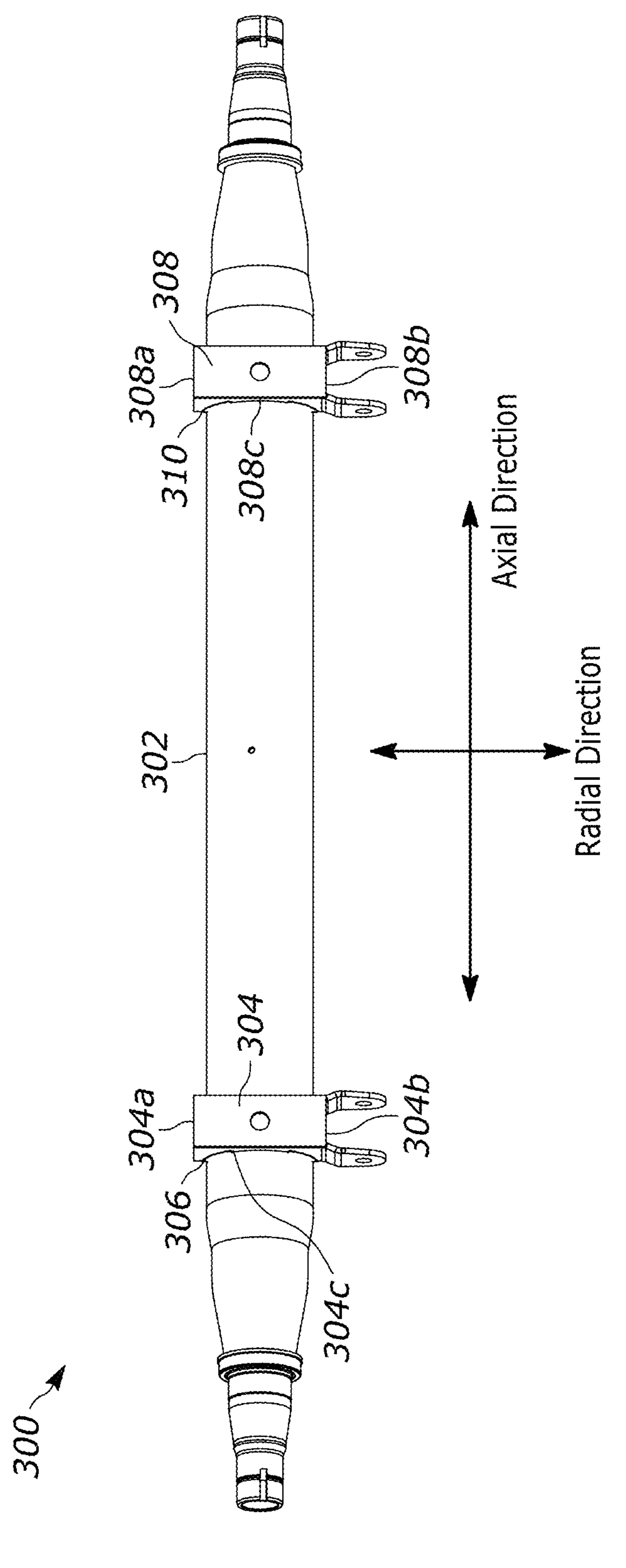

FIG. 3B illustrates an overhead view of the suspension sub-assembly 300. In this example, some of the components, such as leaf springs 312, 314 and U-bolts 316, 318, 320, 322, are omitted for clarity. As illustrated, the spring seats 304, 308 have a width measured along an axial direction of the axle 302 that is similar to and/or the same as a width of the saddles 306, 310 at outer portions 304*a*, 304*b*, 308*a*, 308*b* of the spring seats 304, 308. The axial direction may be along the axis of the axle 302. In this embodiment, the width of the spring seats 304, 308 may be greater than the width of the recesses 306*d* of the saddles 306, 310 at central portions 304*c*, 308*c* of the spring seats 304, 308 to interlock the saddles 306, 310 with the spring seats 304, 308.

Figure 3C:
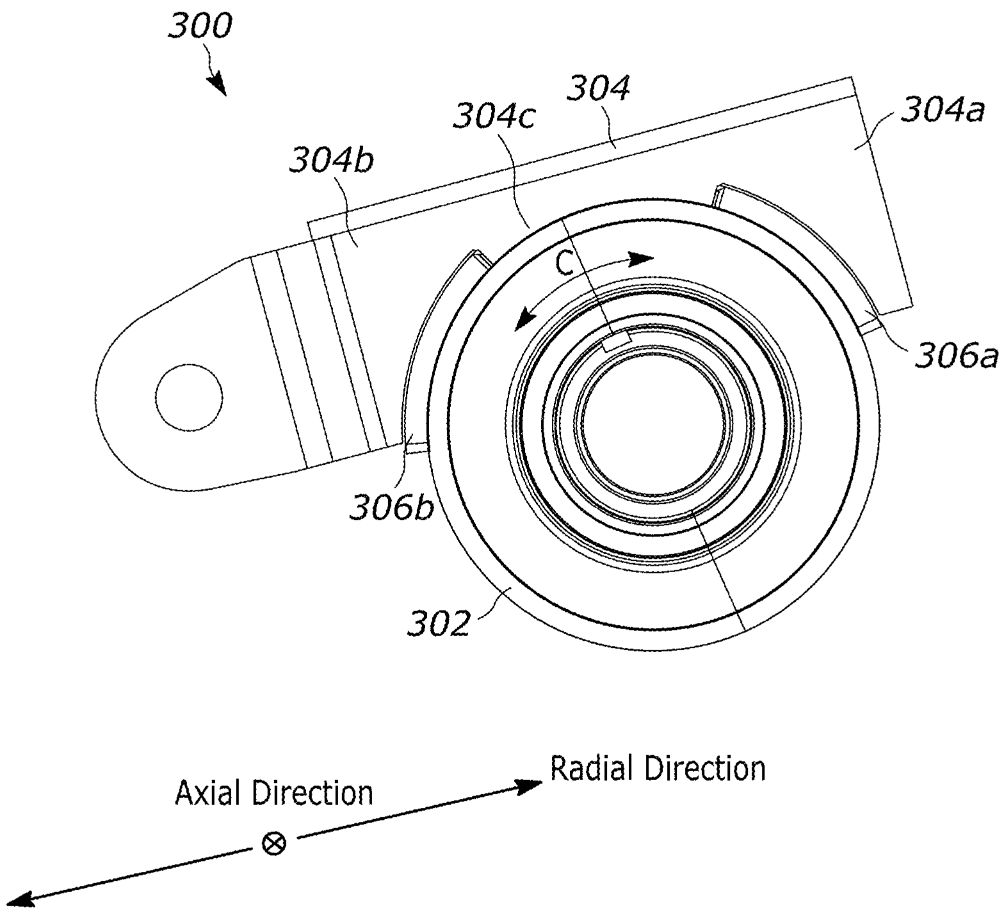

FIG. 3C illustrates a side view of the saddle 306 and spring seat 304 deployed on the axle 302. As illustrated, the outer portion 304*b* of the spring seat 304 is disposed on and above an outer portion 306*b* of the saddle 306. As already noted, the width in the axial direction of the outer portion 306*b* may be the same or similar to the width of the outer portion 304*b* in the axial direction.

Furthermore, the outer portion 304*a* of the spring seat 304 is disposed on and above an outer portion 306*a* of the saddle 306. As already noted, the width in the axial direction of the outer portion 306*a* may be the same or similar to the width of the outer portion 304*a* in the axial direction. The central portion 304*c* of the spring seat 304 may have a width in the axial direction that is greater than the width of a central portion 306*c* (not shown in FIG. 3C as the central portion is hidden; illustrated in FIG. 3D) of the saddle 306. That is, and as will be explained in further detail below, the central portion of the saddle 306 forms a recess 306*d* (shown in FIG. 3D) that the central portion 304*c* (e.g., a protrusion) is disposed within to interlock between the central portion 304*c* and the recess of the saddle 306 to limit and/or prevents the spring seat 304 from moving on the axle 302 circumferentially along the circumferential direction C and axially along the axis of the axle 302.

As shown, the spring seat 304 is in direct contact with the axle 302 at the central portion 304*c*. That is, the central portion 304*c* directly contacts the axle 302. The outer portions 304*a*, 304*b* are out of contact with the axle 302 and instead rest in direct contact with the outer portions 306*a*, 306*b*. Thus, the central portion 304*c* (e.g., protrusion) extends into an area defined by the recess 306*d* of the saddle 306.

Notably, the interlocking between the saddle 306 and the spring seat 304 is free of welding processes to reduce complexity and time-consuming operations. The interlocking is secure and maintains the spring seat 304 in proper alignment. The spring seat 304 may be securely fastened into place to further limit any movement along the radial direction (e.g., lifted upward) when the U-bolts 316, 318 are attached, as described below.

Figure 3D:
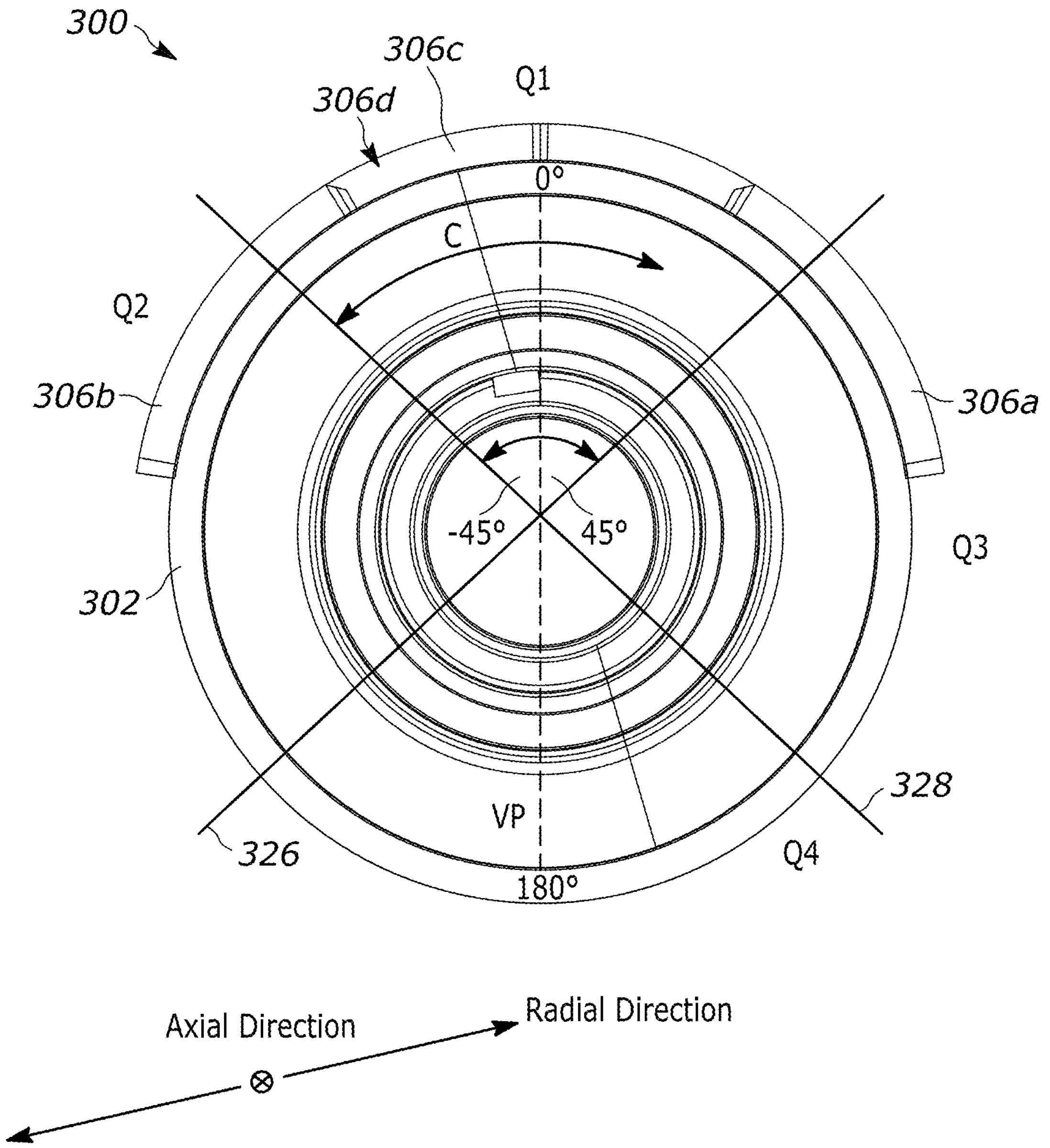

Furthermore, the recess 306*d* has a size and position to be formed on an upper portion of the saddle 306 as shown in FIG. 3D. In FIG. 3D, some of the components, including the spring seat 304, are omitted for clarity. The axle 302 may be divided into quadrants by lines 326, 328. An upper quadrant Q1 of the axle 302 is illustrated. The recess 306*d* is formed on only upper quadrant Q1 of the axle 302 and does not extend into side and lower quadrants Q2, Q3, Q4 of the axle 302. Accordingly, the recess 306*d* is a groove formed over only the top quadrant Q1 of the axle 302. In this example, top quadrant Q1 extends from −45° to 45° (90° total) relative to a vertical plane VP (where 0° is at the top and 180° is at the bottom as shown) and/or gravity normal vector bisecting the axle 302. Similarly, side quadrant Q2 extends from −45° to −135° relative to the vertical plane VP, lower quadrant Q4 extends from −135° to 135° relative to the vertical plane VP, and side quadrant Q3 extends from 45° to 135° relative to the vertical plane VP. In some examples, the recess 306*d* may extend into side quadrants Q2, Q3 from the top quadrant Q1.

Furthermore, and as is apparent, the saddle 306 can be formed over less than 180° of the axle. That is, the saddle 306 has a more efficient design than other implementations that span 180° or more, although larger saddles similarly formed to saddle 306 but that span more than 180° can be included. In some examples, the saddle 306 may span 163 degrees of the axle 302 to minimize the saddle 306 size while also supporting the spring seat 304.

Figure 3E:
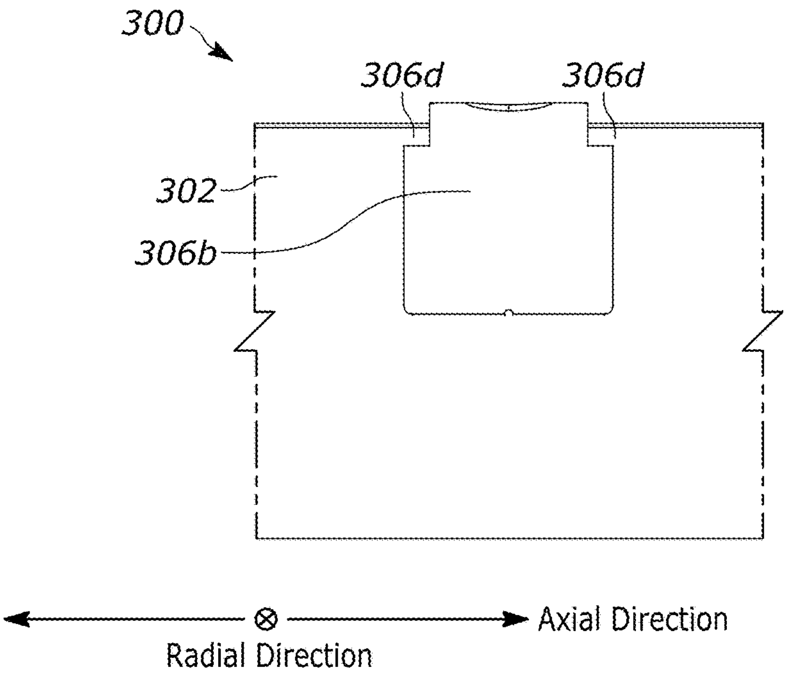

FIG. 3E illustrates a side view of the axle 302 and the saddle 306 with some components omitted. As shown, the recess 306*d* is formed in an uppermost portion of the saddle 306.

Figure 3F:
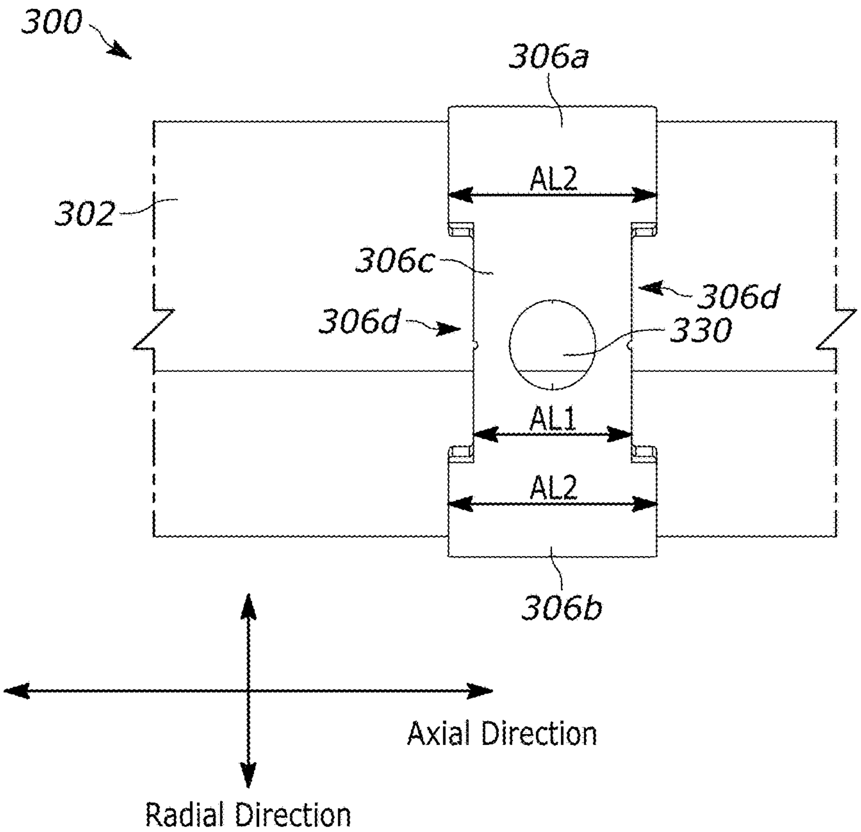

FIG. 3F illustrates an overhead view of the axle 302 and saddle 306 with some components omitted. As shown, the recess 306*d* is formed on opposite sides of the saddles 306 in the axial direction. As discussed above, the central portion 304*c* includes corresponding protrusions on opposite sides of the spring seats 304 in the axial direction to protrude into the recess 306*d*. A central opening 330 of the saddle 306 can receive a bolt (explained in further detail below). As shown, the saddle 306 can be formed of two components that are placed together. In some examples, the saddle 306 can be formed of a single, unitary piece.

In this example, the central portion 306*c* forms recess 306*d*. The central portion 306*c* has a first axial length AL1 as measured along the axis of the axle 302. The outer portion 306*a* (e.g., a peripheral portion) has a second axial length AL2 as measured along the axis of the axle. The second axial length AL2 is greater than the first axial length AL1. The outer portion 306*b* has the second axial length.

Figure 3G:
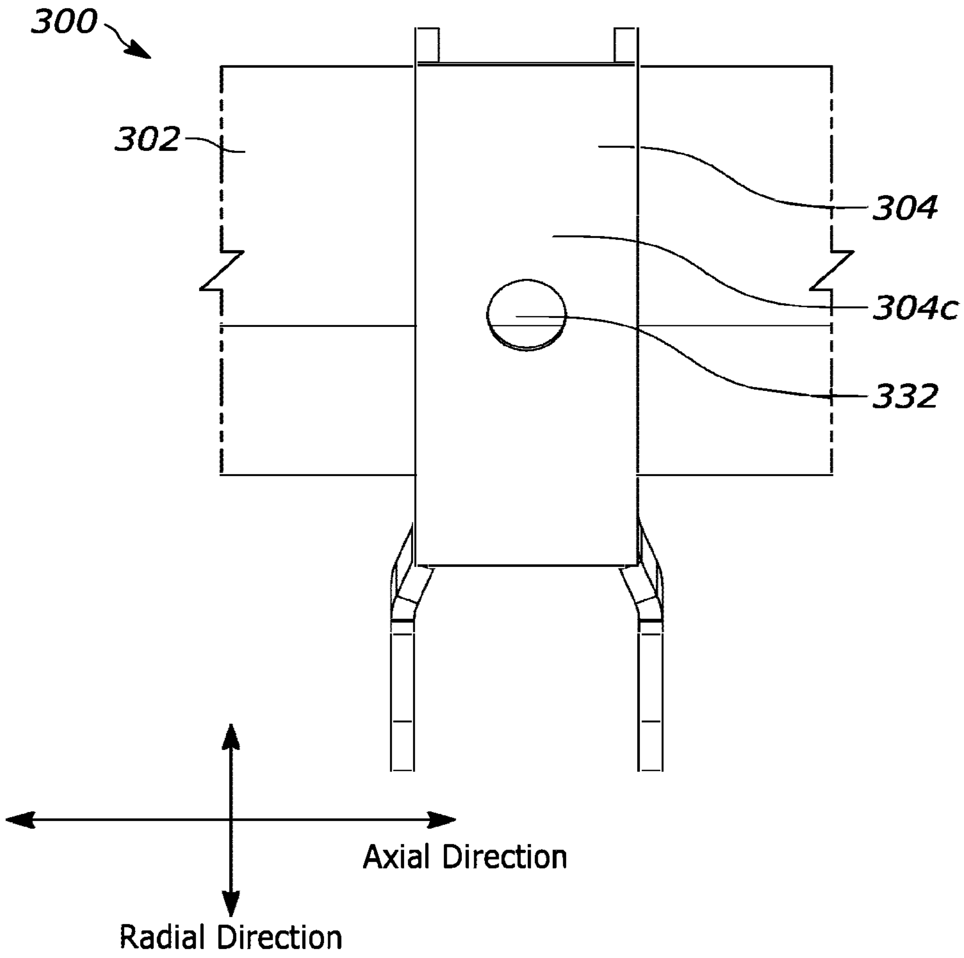

Turning now to FIG. 3G, an overhead view of the spring seat 304 is illustrated. Some components are omitted for clarity, whereas the saddle 306 is hidden by the spring seat 304 in this view. In this example, an aperture 332 is formed in the central portion 304*c* of the spring seat 304. The bolt mentioned above can be inserted into the aperture 332 as well as leaf springs 314 to maintain a position of the leaf springs 314.

Figure 3H:
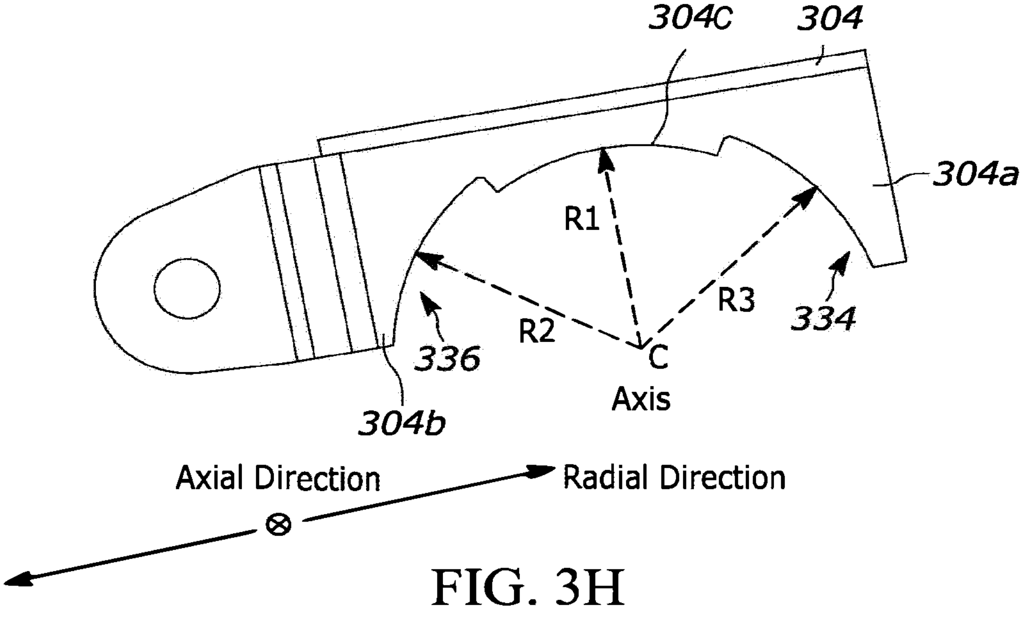

FIG. 3H illustrates a side view of the spring seat 304. The spring seat 304 has a non-uniform radius as measured from an axis (e.g., a central axis) of the spring seat 304. The axis may be a center point about which circularly shaped segments (e.g., arcs) of the spring seat 304 are formed by outer portion 306*a*, outer portion 306*b* and central portion 306*c*. The center point C is an axis of curvature of the spring seat 304 (which may be colinear with the axis of the axle 302 when the spring seat 304 is mounted on the axle 302) such that the radiuses R1, R2, R3 have a reference point defining the radiuses R1, R2, R3.

A radius R1 as measured between the axis and a nearest surface of the central portion 306*c* is a first length, a radius R2 as measured between the axis and a nearest surface of the outer portion 306*b* is a second length, and a radius R3 as measured between the axis and a nearest surface of the outer portion 306*a* is a third length. The first length is different from the second and third lengths. For example, the first length is less than each of the second and third lengths since the central portion 306*c* forms a protrusion. In some examples, the second and third lengths are equal. In some examples, the entire nearest surface of outer portion 306*b* has the radius R2. In some examples, the entire nearest surface of outer portion 306*a* has the radius R3. In some examples, the entire nearest surface of central portion 306*c* has the radius R1.

Thus, the radius R1 of the spring seat 304 at the central portion 306*c* (protrusion) is less than the radii R2, R3 of the spring seat 304 at an area outside the central portion 306*c*.

As illustrated, the protrusion of the central portion 306*c* is defined by first and second curved recesses 334, 336 of the spring seat 304. While the arc lengths of the curved recesses 334, 336 can be equal in some examples, this is not a requirement and the arc lengths of the curved recesses 334, 336 can be different from each other in other examples.

While the spring seat 304 and saddle 306 are described in detail in FIGS. 3C-3H, it will be understood that the spring seat 308 and saddle 310 and can be similarly and/or identically formed. In some cases, more or less spring seats and saddles are included in some examples.

It is also worth noting that the recesses 306*d* formed in the outer periphery of the saddle 306 may be adjusted to be other receiving features such as holes, notches, etc. formed within the perimeter of the saddle 306. For example, in some examples the recesses 306*d* are notches that are encircled in an overhead view of the saddle 306 to be closed on opposing axial and lateral sides by walls of the saddle 306.

Figure 4A:
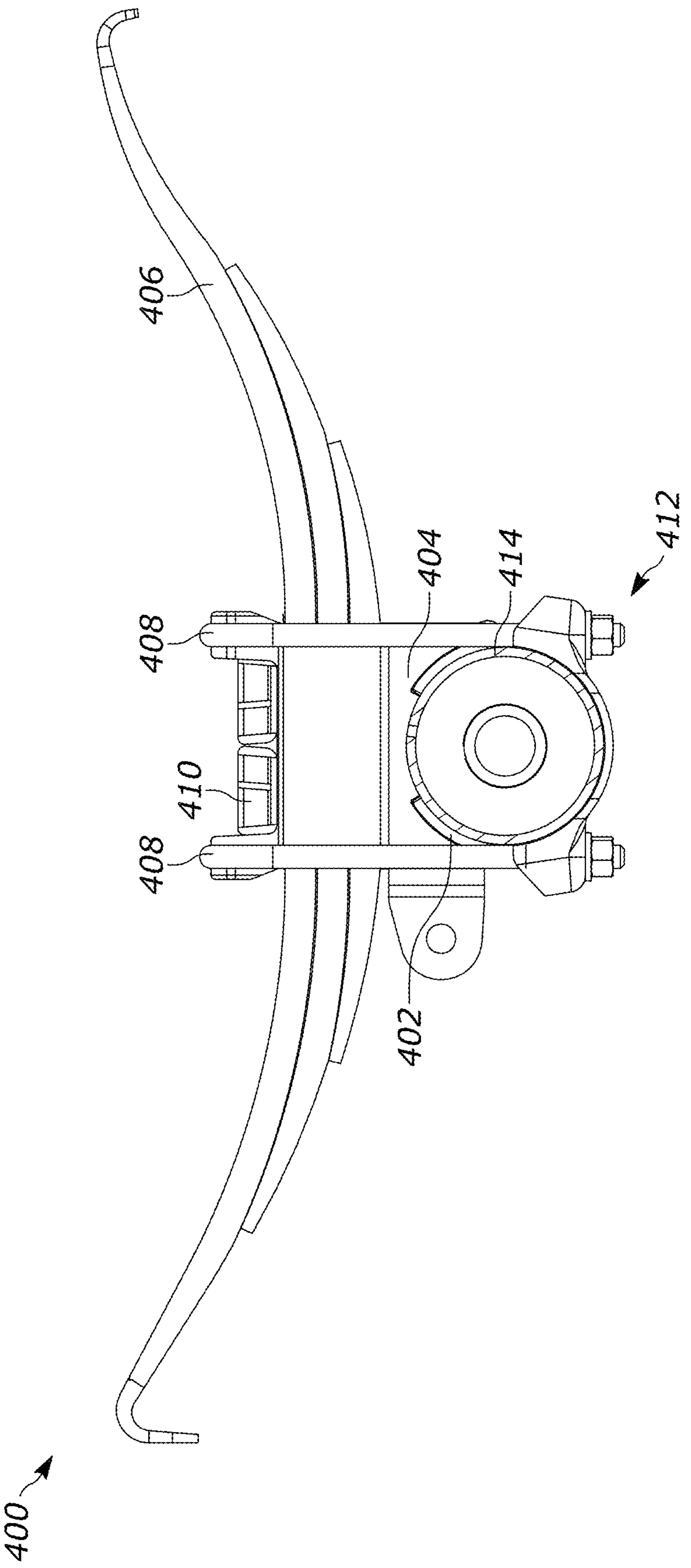
FIGS. 4A and 4B are respective elevational and exploded, perspective views illustrating details of a suspension system according to one or more example implementations of the instant disclosure.
Figure 4B:
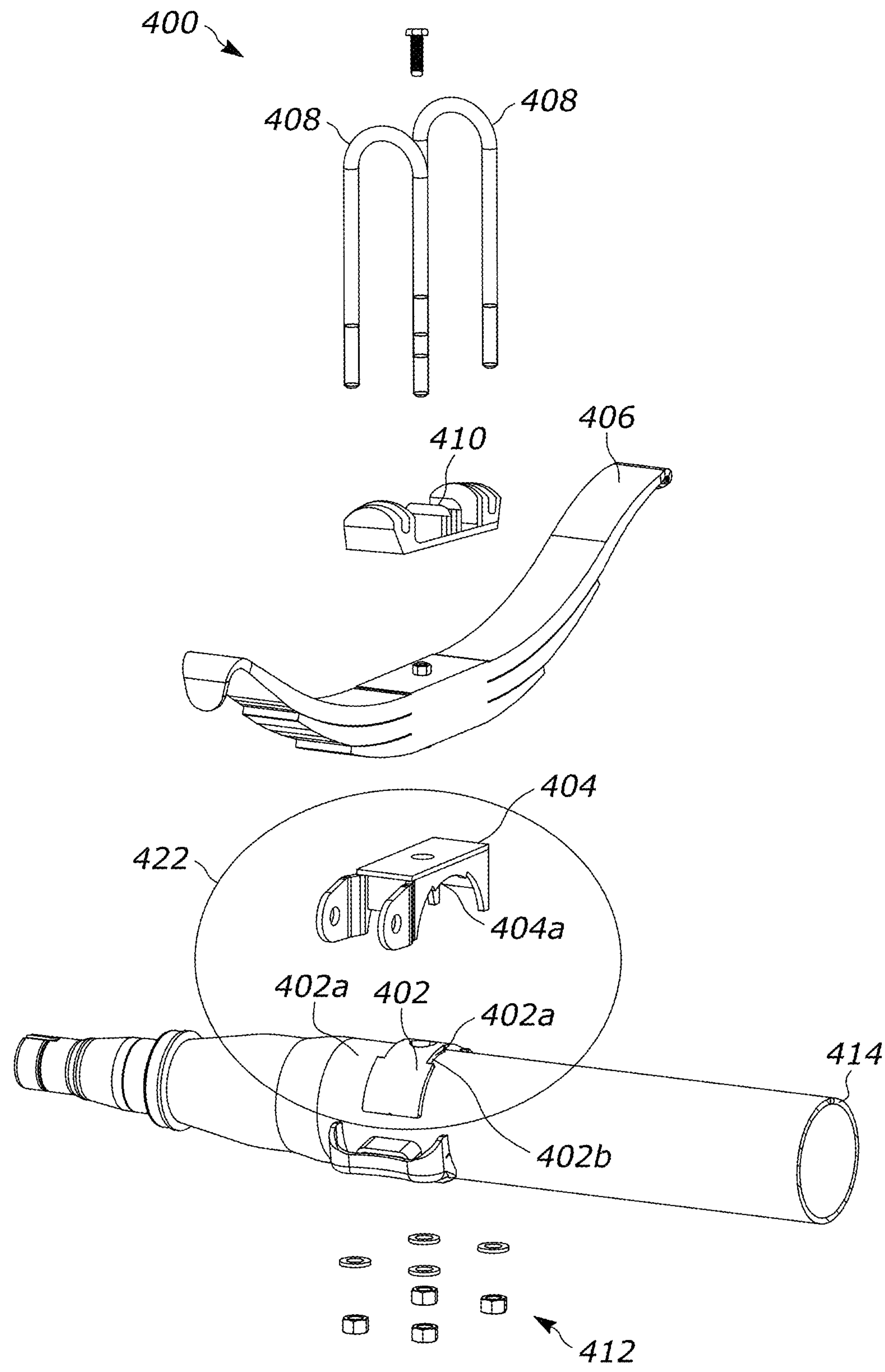

FIGS. 4A and 4B illustrate a suspension 400 according to enhanced examples as described herein. Aspects of an interlocked spring seat 422 are combinable with suspension sub-assembly 300 (FIGS. 3A-3H). FIG. 4A shows the suspension 400 fully assembled. FIG. 4B illustrates an exploded view of the suspension 400. In this example, the saddle 402 is welded onto axle 414. Accordingly, a spring seat 404 (of any height) can be attached to the saddle 402. A protrusion 404*a* (disposed on opposite sides) of the spring seat 404 may be inserted into recesses 402*a*, 402*b* of the saddle 402. That is, the protrusion 404*a* and the recess 402*a*, 402*b* interlock together to form a releasable connection between the saddle 402 and the spring seat 404.

The axle 414, saddle 402 and spring seat 404 may together form spring suspension support assembly. A leaf spring 406 is disposed on the spring suspension support assembly. Top bracket 410 may be disposed on the leaf spring 406. U-bolts 408 may fasten the axle 414, saddle 402, spring seat 404, leaf spring 406 and top bracket 410 together by tightening fasteners 412 onto the U-bolts 408.

Figure 5:
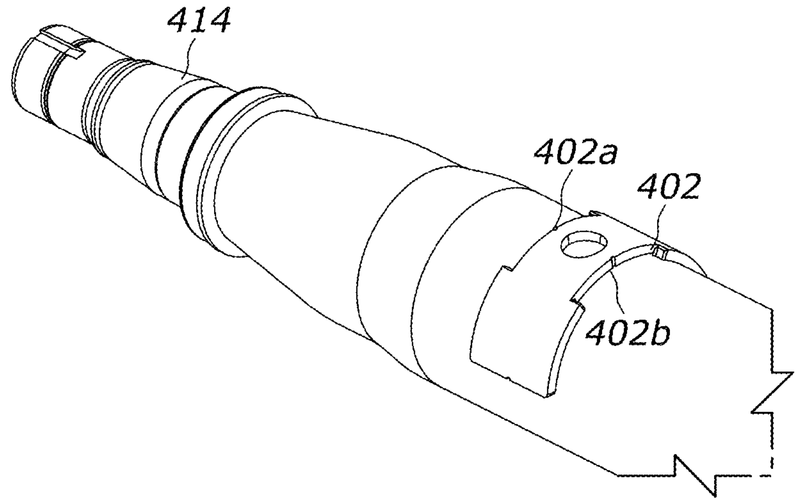
FIG. 5 is a perspective view illustrating details of a saddle and axle of the suspension system of FIGS. 4A and 4B.

FIG. 5 illustrates a perspective view of axle 414 and saddle 402. The saddle 402 location may be flexible.

Figure 6:
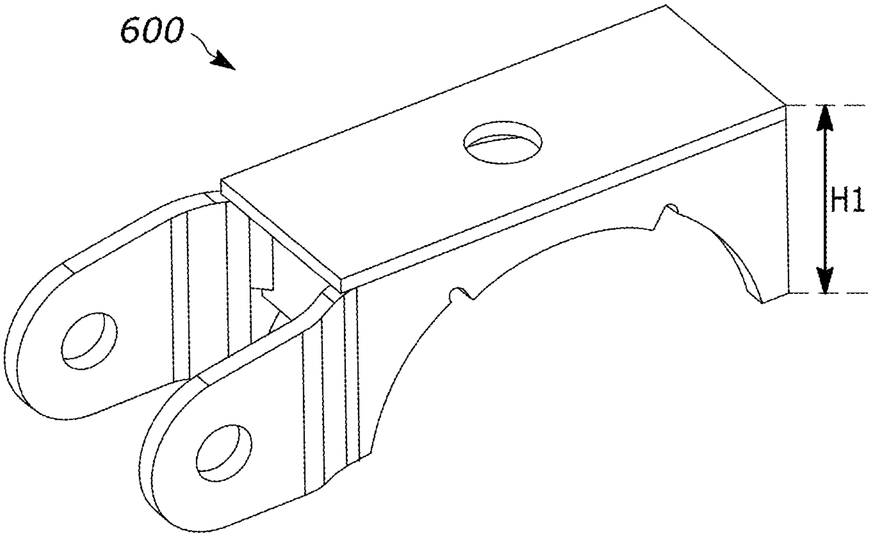
FIGS. 6, 7 and 8 are views illustrating details of spring seats according to one or more example implementations of the instant disclosure.
Figure 7:
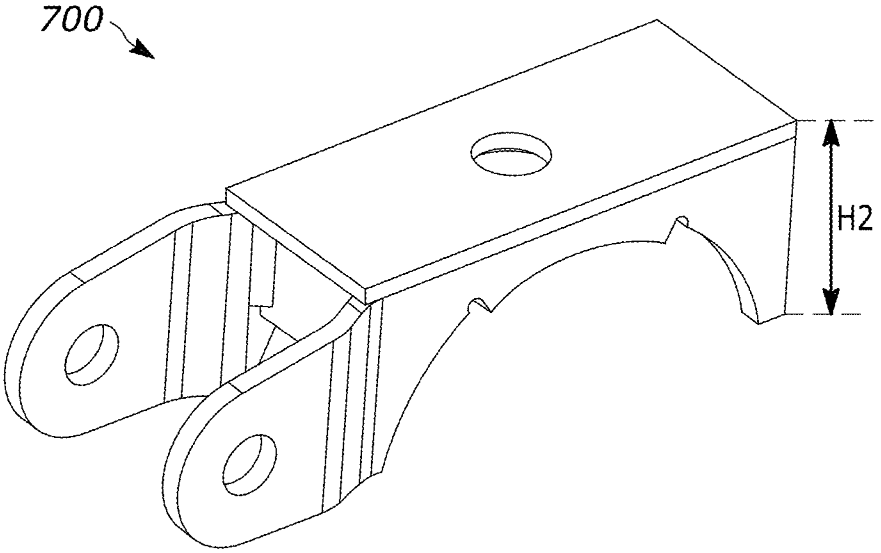
Figure 8:
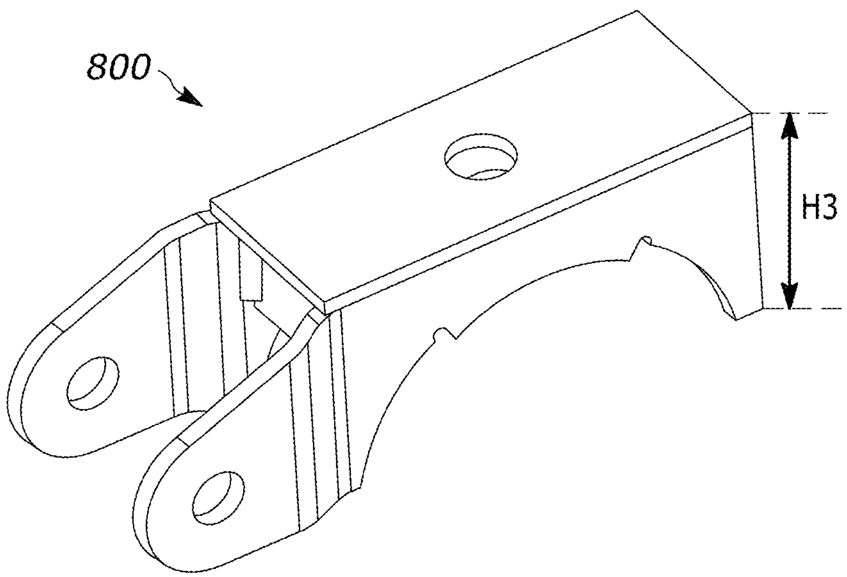

FIGS. 6, 7 and 8 illustrate first-third spring seats 600, 700 and 800. The first-third spring seats 600, 700 and 800 have different heights H1, H2, H3. The first-third spring seats 600, 700 and 800 may be readily substituted for the spring seat 404 (FIGS. 4A and 4B) as well as spring seats 304, 308 (FIGS. 3A, 3B, 3C, 3G and 3H). The first spring seat 600 has a smallest height H1 from the first-third spring seats 600, 700 and 800. The second spring seat 700 has an intermediate height H2 from the first-third spring seats 600, 700 and 800. The third spring seat 800 has a greatest height H3 from the first-third spring seats 600, 700 and 800. Although three heights are shown, a variety of heights are combinable with aspects of the present application.

Figure 9A:
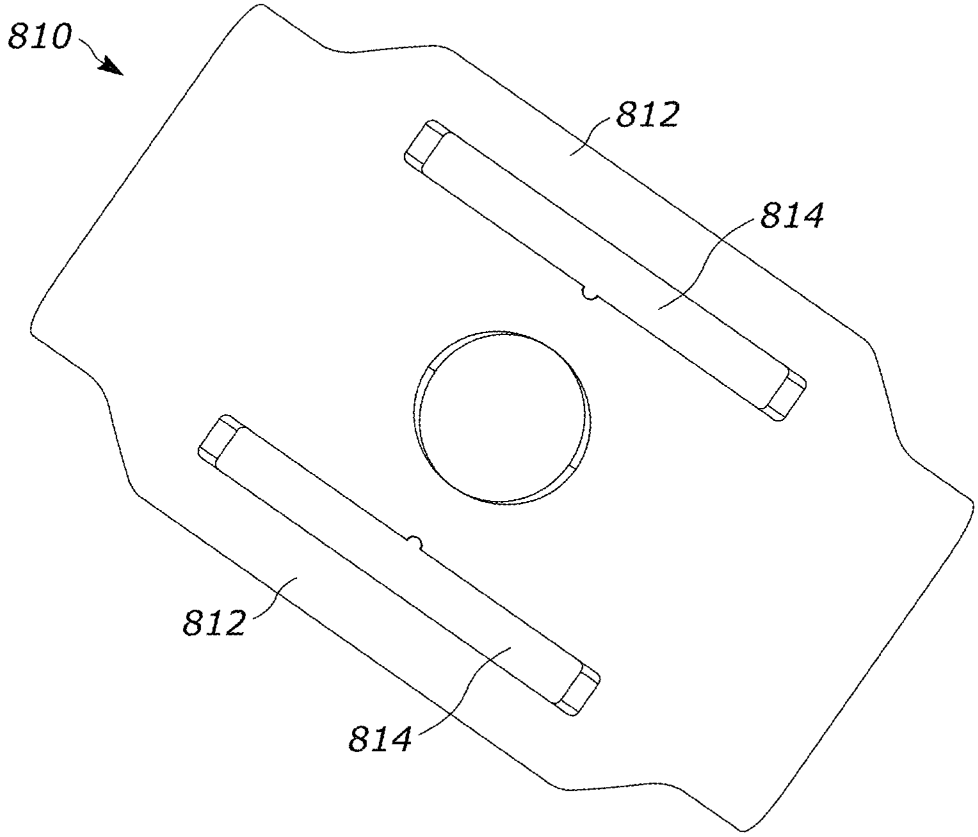
FIGS. 9A and 9B are views illustrating a saddle with an enclosed aperture according to one or more example implementations of the instant disclosure.
Figure 9B:
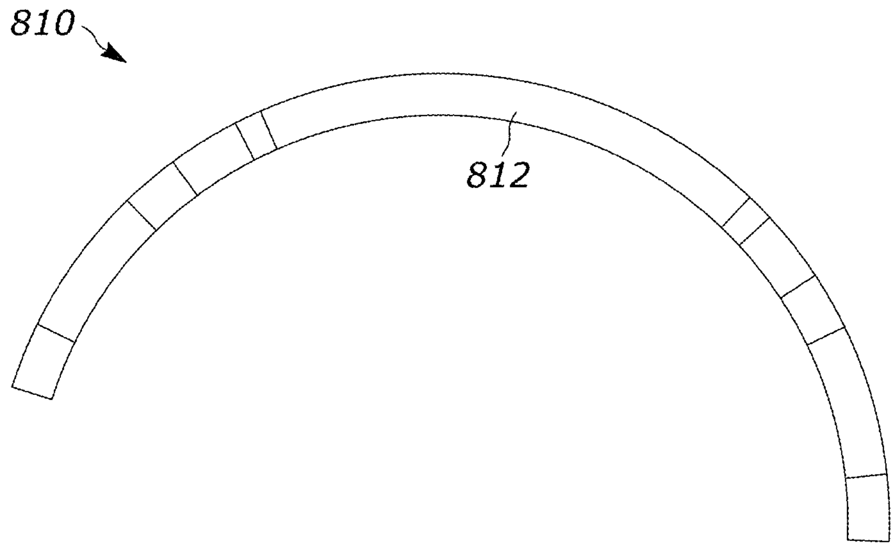

FIGS. 9A and 9B show an example of a saddle 810 with an enclosed aperture 814 that is enclosed by outer periphery 814 of the saddle 810. FIG. 9B shows a sideview of the saddle 810. The saddle 810 can readily be substituted for saddles 306, 310 (FIGS. 3A-3H) and saddle 402 (FIGS. 4A-4B).

Figure 10A:
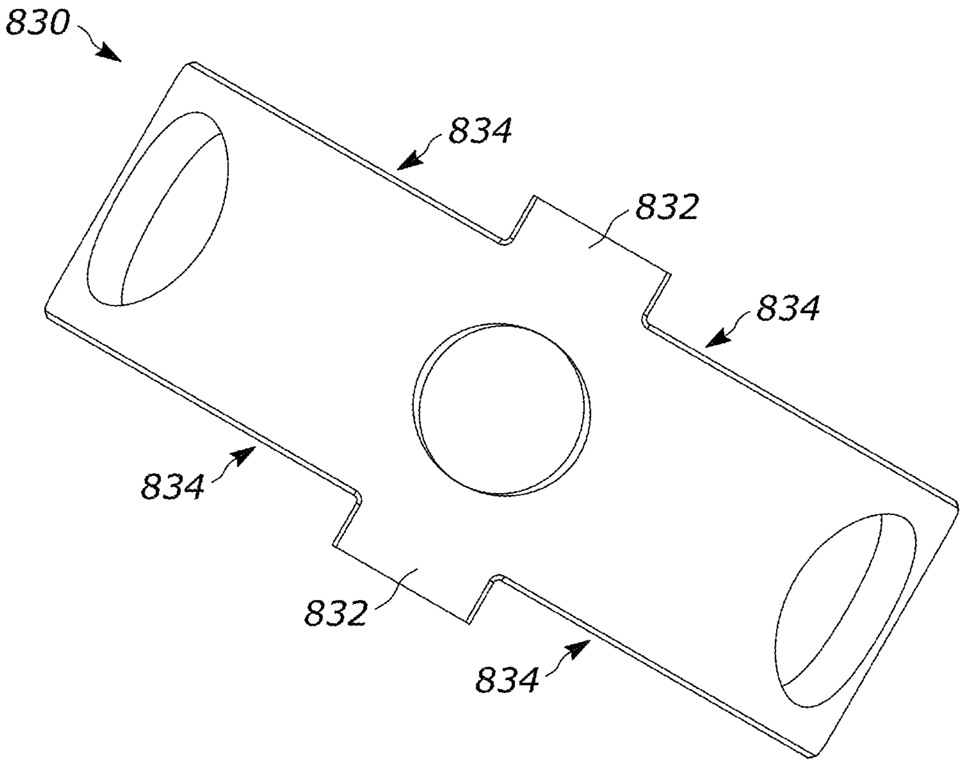
FIGS. 10A and 10B are views illustrating a saddle with a protrusion according to one or more example implementations of the instant disclosure.
Figure 10B:
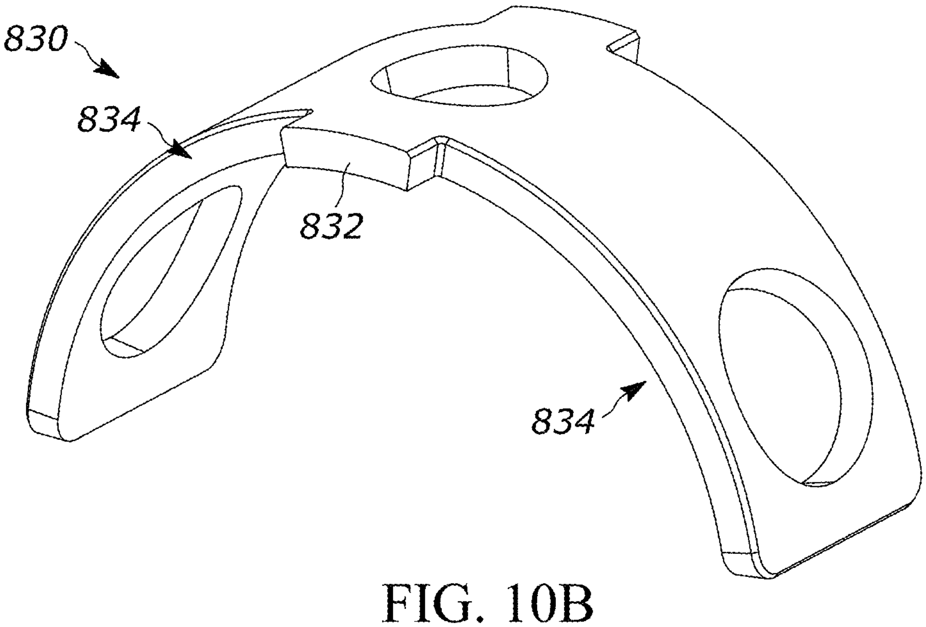

FIGS. 10A and 10B show an example of a saddle 830 with a protrusion 832 that is formed by two recesses 834 on opposite sides of the protrusion 832. FIG. 9B shows a sideview of the saddle 830. The saddle 830 can readily be substituted for saddles 306, 310 (FIGS. 3A-3H) and saddle 402 (FIGS. 4A-4B).

It will be appreciated after reading the present disclosure that any standard equipment and/or manufacturing processes may be used singly or in any combination with the processes of the present disclosure. For example, CNC machines, forging equipment, heat treatment furnaces, grinding machines, drilling/boring machines, threading machines, welding equipment, etc. may be used.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope of the disclosure. The implementation(s) were chosen and described to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A spring suspension support assembly comprising:
- an axle;
- a saddle disposed on the axle, and forming a recess; and
- a spring seat disposed on the saddle and forming a protrusion to extend into the recess and interlock with the recess of the saddle to reduce relative movement between the saddle and the spring seat, wherein an axis of the spring seat is a center point of a circularly shaped protrusion surface of the protrusion and a circularly shaped outer surface of an outer portion of the spring seat, wherein a first radius as measured between the axis and the circularly shaped protrusion surface is a first length, and a second radius as measured between the axis and the circularly shaped outer surface is a second length, wherein the first length is less than the second length.

2. The spring suspension support assembly of claim 1, wherein the recess is a groove formed over only a top quadrant of the axle.

3. The spring suspension support assembly of claim 1, wherein the saddle is formed over less than 180 degrees of a circumference of the axle.

4. The spring suspension support assembly of claim 1, wherein the spring seat is in direct contact with the axle.

5. The spring suspension support assembly of claim 1, wherein a width of the spring seat at the protrusion is greater than a width of a portion of the saddle that forms the recess.

6. The spring suspension support assembly of claim 1, wherein the protrusion is defined by first and second curved recesses.

7. The spring suspension support assembly of claim 1, wherein the interlocking between the protrusion and the recess prevents the spring seat from moving circumferentially and axially on the axle.

8. The spring suspension support assembly of claim 1, wherein the protrusion and the recess interlock together to form a releasable connection between the saddle and the spring seat.

9. The spring suspension support assembly of claim 1, wherein the saddle has a welded connection to the axle.

10. The spring suspension support assembly of claim 1, wherein the spring seat has a non-uniform radius as measured from an axis of the spring seat.

11. A suspension sub-assembly comprising:
- the spring suspension support assembly of claim 1; and
- a leaf spring disposed on the spring suspension support assembly.

12. The spring suspension support assembly of claim 1, wherein the recess is disposed in a side quadrant of the axle.

13. A system comprising:
- a saddle for disposal on an axle, the saddle comprising:
  - a central portion forming a recess, the central portion having a first axial length as measured along an axis of the axle; and
  - a peripheral portion having a second axial length as measured along the axis of the axle, wherein the second axial length is greater than the first axial length; and
- a spring seat disposed on the saddle and forming a protrusion to extend into the recess and interlock with the recess of the saddle, wherein an axis of the spring seat is a center point of a circularly shaped protrusion surface of the protrusion and a circularly shaped outer surface of an outer portion of the spring seat, wherein a first radius as measured between the axis and the circularly shaped protrusion surface is a first length, and a second radius as measured between the axis and the circularly shaped outer surface is a second length, wherein the first length is less than the second length.

14. The system of claim 13, wherein the recess is a groove formed over only a top quadrant of the axle.

15. The system of claim 13, wherein the saddle is formed over less than 180 degrees of the axle.

16. The system of claim 13, wherein the saddle has a welded connection to the axle.

17. A spring seat for disposal on an axle and a saddle, the spring seat comprising:
- a protrusion to extend into a recess of the saddle and interlock with the recess of the saddle to reduce relative movement between the saddle and the spring seat; and
- a portion that extends over the saddle;
- wherein an axis of the spring seat is a center point of a circularly shaped protrusion surface of the protrusion and a circularly shaped outer surface of an outer portion of the spring seat, wherein a first radius as measured between the axis and the circularly shaped protrusion surface is a first length, and a second radius as measured between the axis and the circularly shaped outer surface is a second length, wherein the first length is less than the second length.

18. The spring seat of claim 17, wherein the circularly shaped protrusion surface is in direct contact with the axle, and the circularly shaped outer surface is in direct contact with the saddle so that the saddle is disposed between the circularly shaped outer surface and the axle on a straight line.

19. The spring seat of claim 17, wherein:

the protrusion is defined by first and second curved recesses;

the protrusion and the recess interlock together to form a releasable connection between the saddle and the spring seat and reduce the spring seat from moving circumferentially and axially on the axle;

the spring seat has a non-uniform radius as measured from an axis of the spring seat; and the radius of the spring seat at the protrusion is less than the radius of the spring seat at an area outside the protrusion.

* * * * *